(12) United States Patent
Chang et al.

(10) Patent No.: US 12,492,724 B2
(45) Date of Patent: Dec. 9, 2025

(54) LINEAR GUIDEWAY AND UPPER DUSTPROOF MEMBER THEREOF

(71) Applicant: OME TECHNOLOGY CO., LTD., New Taipei (TW)

(72) Inventors: Jo-Hsuan Chang, New Taipei (TW); Wei-Min Wang, New Taipei (TW); Yue-Ru Sung, New Taipei (TW); Jhih-Jie Luo, New Taipei (TW)

(73) Assignee: OME TECHNOLOGY CO., LTD., New Taipei (TW)

( * ) Notice: Subject to any disclaimer, the term of this patent is extended or adjusted under 35 U.S.C. 154(b) by 130 days.

(21) Appl. No.: 18/406,284

(22) Filed: Jan. 8, 2024

(65) Prior Publication Data

US 2025/0092913 A1 Mar. 20, 2025

(30) Foreign Application Priority Data

Sep. 14, 2023 (TW) .................................. 112135013

(51) Int. Cl.
*F16C 29/08* (2006.01)
*F16C 29/06* (2006.01)

(52) U.S. Cl.
CPC ........ *F16C 29/088* (2013.01); *F16C 29/0609* (2013.01); *F16C 29/064* (2013.01)

(58) Field of Classification Search
CPC .............................. F16C 29/084; F16C 29/088
See application file for complete search history.

(56) References Cited

U.S. PATENT DOCUMENTS

| 5,871,282 A * | 2/1999 | Yuasa | F16C 29/065 |
| | | | 277/412 |
| 7,950,852 B2 * | 5/2011 | Kondo | F16C 29/086 |
| | | | 384/15 |
| 2023/0332642 A1 * | 10/2023 | Liao | F16C 29/0607 |

FOREIGN PATENT DOCUMENTS

| CN | 113236667 A | 8/2021 |
| JP | 200857755 A | 3/2008 |
| TW | I806551 B | 6/2023 |
| TW | M649827 U | 12/2023 |

* cited by examiner

*Primary Examiner* — James Pilkington
(74) *Attorney, Agent, or Firm* — Li & Cai Intellectual Property (USA) Office

(57) ABSTRACT

An upper dustproof member of a linear guideway includes a connection segment and two floating dustproof segments that are respectively connected to two opposite sides of the connection segment. Each of the two floating dustproofing segments has a carrying bar and at least one rib that is connected to the carrying bar. In each of the two floating dustproofing segments, the carrying bar has two end portions each having a bevel arranged away from the at least one rib. When the bevels of the end portions of the upper dustproof member are respectively inserted into four tolerance slots of two end caps, each of the end portions and the corresponding end cap have a tolerance gap therebetween, so that a slanting surface of each of the bevels abuts against the corresponding tolerance slot, and each of the end portions is deformable toward the corresponding tolerance gap.

10 Claims, 10 Drawing Sheets

LINEAR GUIDEWAY AND UPPER DUSTPROOF MEMBER THEREOF

CROSS-REFERENCE TO RELATED PATENT APPLICATION

This application claims the benefit of priority to Taiwan Patent Application No. 112135013, filed on Sep. 14, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a guideway, and more particularly to a linear guideway and an upper dustproof member thereof.

BACKGROUND OF THE DISCLOSURE

After a conventional upper dustproof member is assembled in a linear guideway, a predetermined contact force cannot be maintained between the conventional upper dustproof member and a track on which it slides due to assembling tolerances of the linear guideway, such that the service life and dustproof effect of the conventional upper dustproof member would be virtually affected.

SUMMARY OF THE DISCLOSURE

In response to the above-referenced technical inadequacies, the present disclosure provides a linear guideway and an upper dustproof member thereof for effectively improving on the issues associated with conventional upper dustproof members.

In order to solve the above-mentioned problems, one of the technical aspects adopted by the present disclosure is to provide a linear guideway, which includes a track, a sliding module, and two end caps. The track has two lateral surfaces respectively arranged on two opposite sides thereof and an upper surface that is connected to the two lateral surfaces. The sliding module is slidably disposed on the track along a sliding direction. The sliding module includes a slider, two circulation seats, and an upper dustproof member. The slider has a base portion and two lateral wing portions that respectively extend from the base portion. Inner sides of the two lateral wing portions respectively face toward the two lateral surfaces. The two circulation seats are respectively assembled to the two lateral wing portions and respectively correspond in position to the two lateral surfaces. The upper dustproof member includes a connection segment and two floating dustproof segments. The connection segment corresponds in position to the base portion of the slider. The two floating dustproof segments are respectively connected to two opposite sides of the connection segment. Each of the two floating dustproofing segments has a carrying bar and at least one rib that is connected to the carrying bar. In each of the two floating dustproofing segments, the carrying bar has two end portions respectively protruding from beyond two end surfaces of the slider, and each of the two end portions has a bevel arranged away from the at least one rib. The two end caps are respectively assembled to the two end surfaces of the slider and are slidably disposed on the track. Each of the two end caps has two tolerance slots recessed in a surface thereof arranged adjacent to the corresponding end surface. In each of the two end caps, slot openings of the two tolerance slots are arranged away from each other along a width direction perpendicular to the sliding direction, and each of the slot openings has a stopping corner and a matching corner that faces toward the stopping corner along a thickness direction perpendicular to the sliding direction and the width direction. The bevels of the end portions of the upper dustproof member are respectively inserted into the tolerance slots of the two end caps, and each of the end portions and the corresponding end cap have a tolerance gap therebetween, so that when the at least one rib of each of the two floating dustproof segments abuts against the upper surface of the track, a slanting surface of each of the bevels abuts against the matching corner of the corresponding tolerance slot, and each of the end portions is deformable toward the corresponding tolerance gap.

In order to solve the above-mentioned problems, another one of the technical aspects adopted by the present disclosure is to provide an upper dustproof member of a linear guideway, which includes a connection segment and two floating dustproof segments respectively connected to two opposite sides of the connection segment. Each of the two floating dustproofing segments has a carrying bar and at least one rib that is connected to the carrying bar. In each of the two floating dustproofing segments, the carrying bar has two end portions each having a bevel arranged away from the at least one rib. When the bevels of the end portions of the upper dustproof member are respectively inserted into four tolerance slots of two end caps, each of the end portions and the corresponding end cap have a tolerance gap therebetween, so that a slanting surface of each of the bevels abuts against the corresponding tolerance slot, and each of the end portions is deformable toward the corresponding tolerance gap.

Therefore, the linear guideway provided by the present disclosure can allow each of the end portions to be deformable toward the corresponding tolerance gap through the structural cooperation between each of the end portions and the corresponding tolerance slot, thereby absorbing an assembling tolerance of components in the linear guideway and maintaining a contact force between the upper dustproof member and the track.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
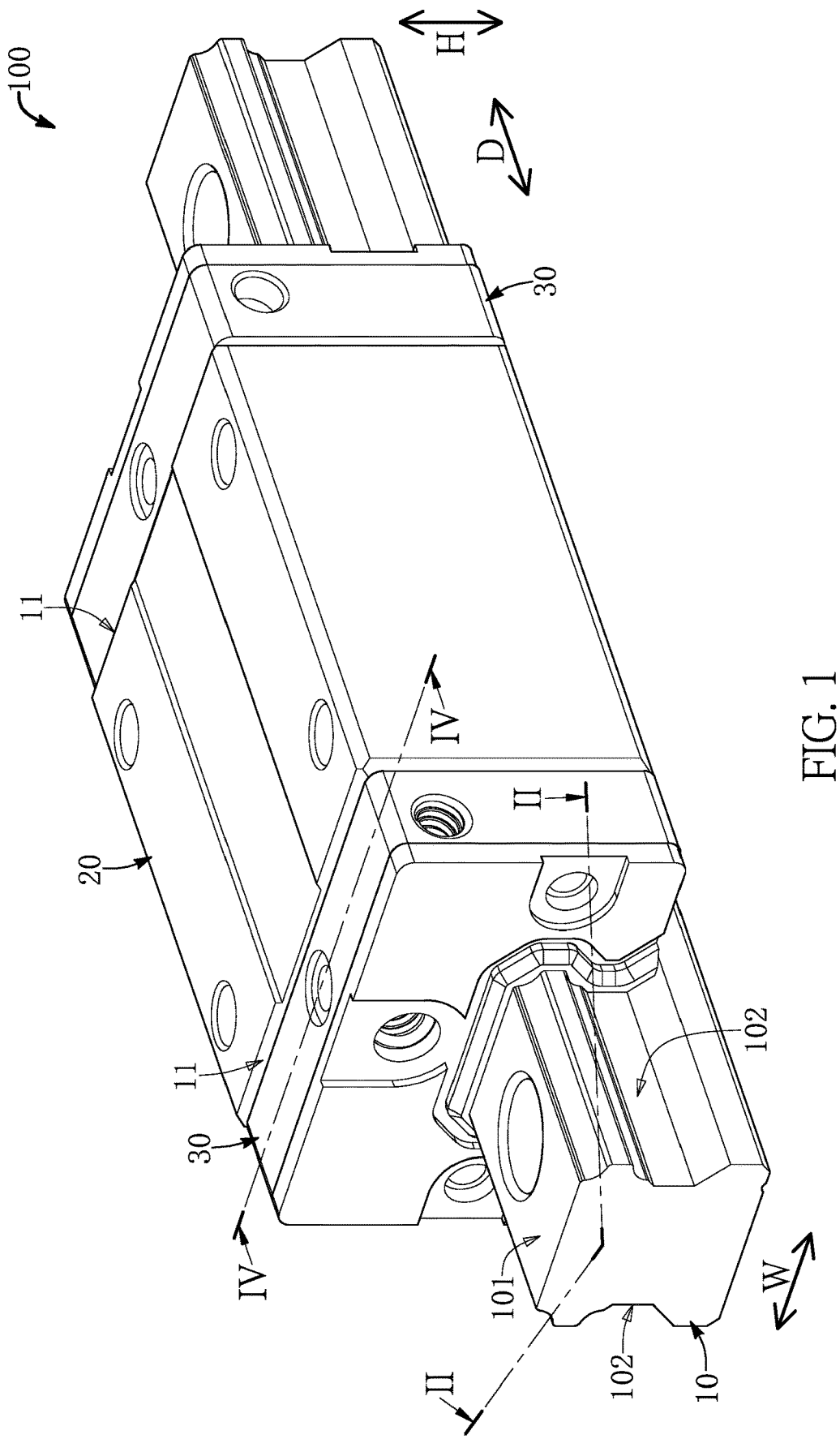
FIG. 1 is a schematic perspective view of a linear guideway according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 9, a first embodiment of the present disclosure provides a linear guideway 100. The linear guideway 100 in the following description is a standard linear guideway, but the present disclosure is not limited thereto. As shown in FIG. 1 to FIG. 5, the linear guideway 100 in the present embodiment includes a track 10 having an elongated shape, a sliding module 20 slidably disposed on the track 10 along a sliding direction D, and two end caps 30 that are respectively assembled to two opposite ends of the sliding module 20 and that are slidably disposed on the track 10.

Figure 2:
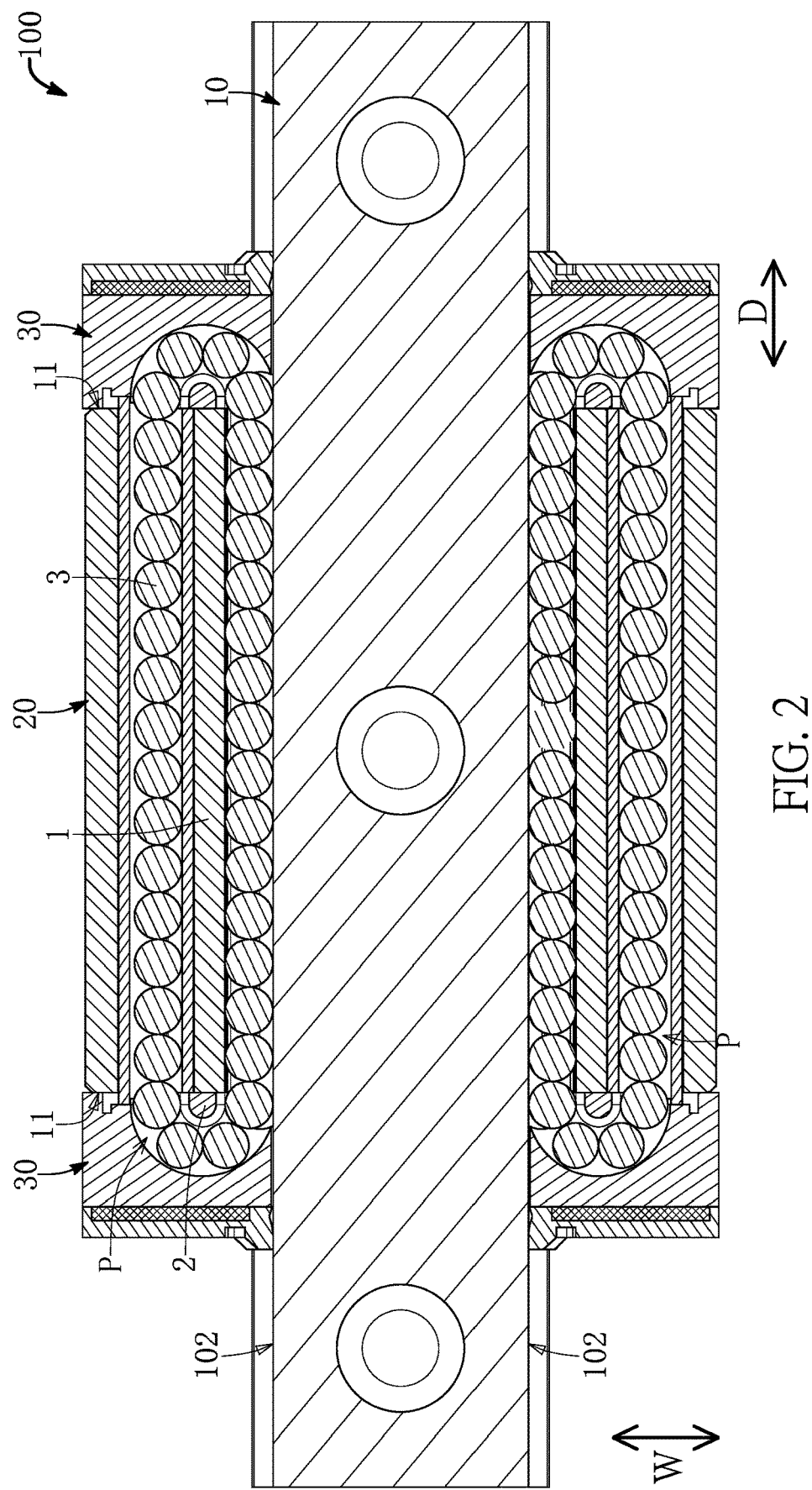
FIG. 2 is a schematic cross-sectional view taken along line II-II of FIG. 1.
Figure 4:
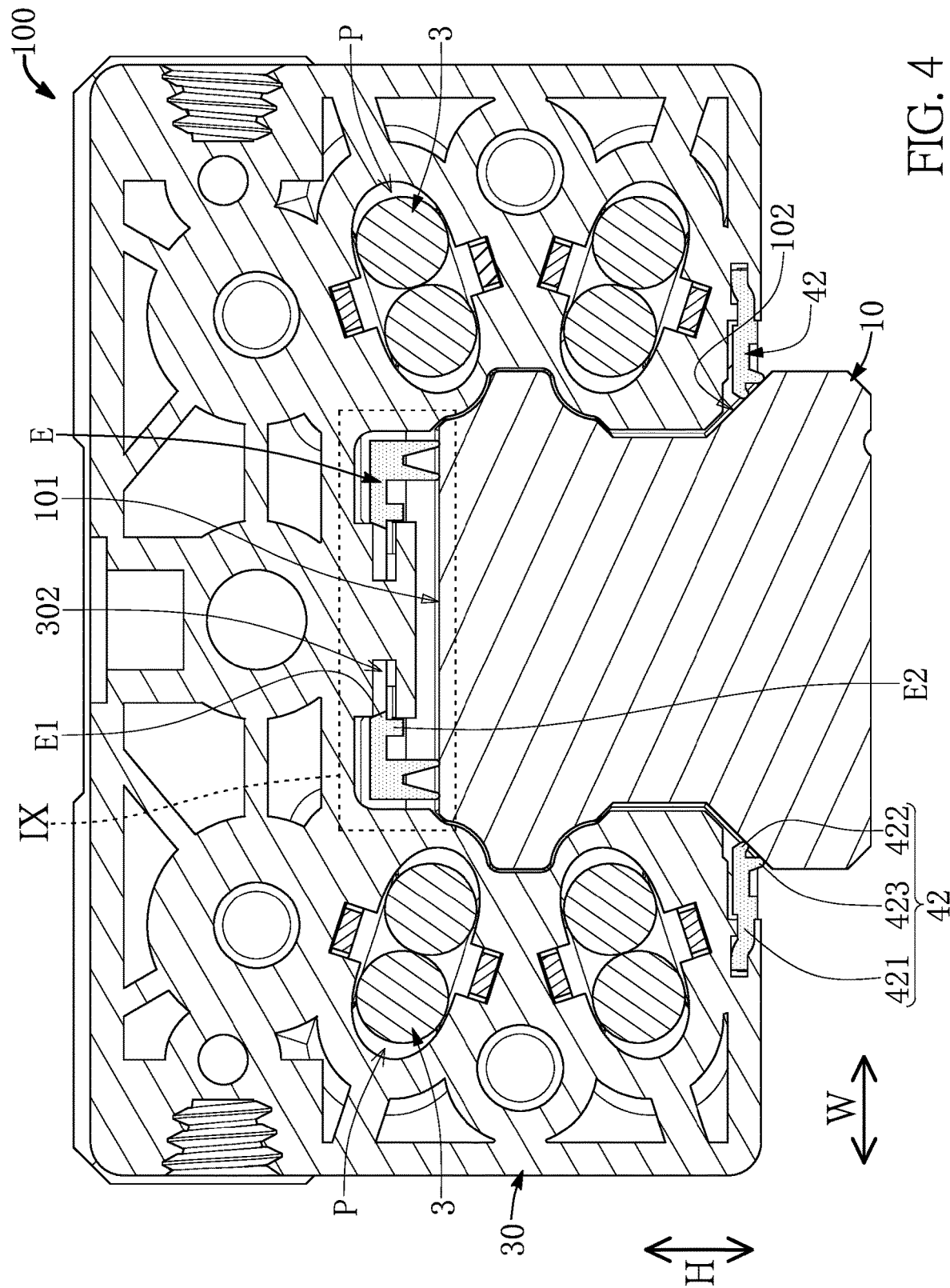
FIG. 4 is a schematic cross-sectional view taken along line IV-IV of FIG. 1.
Figure 5:
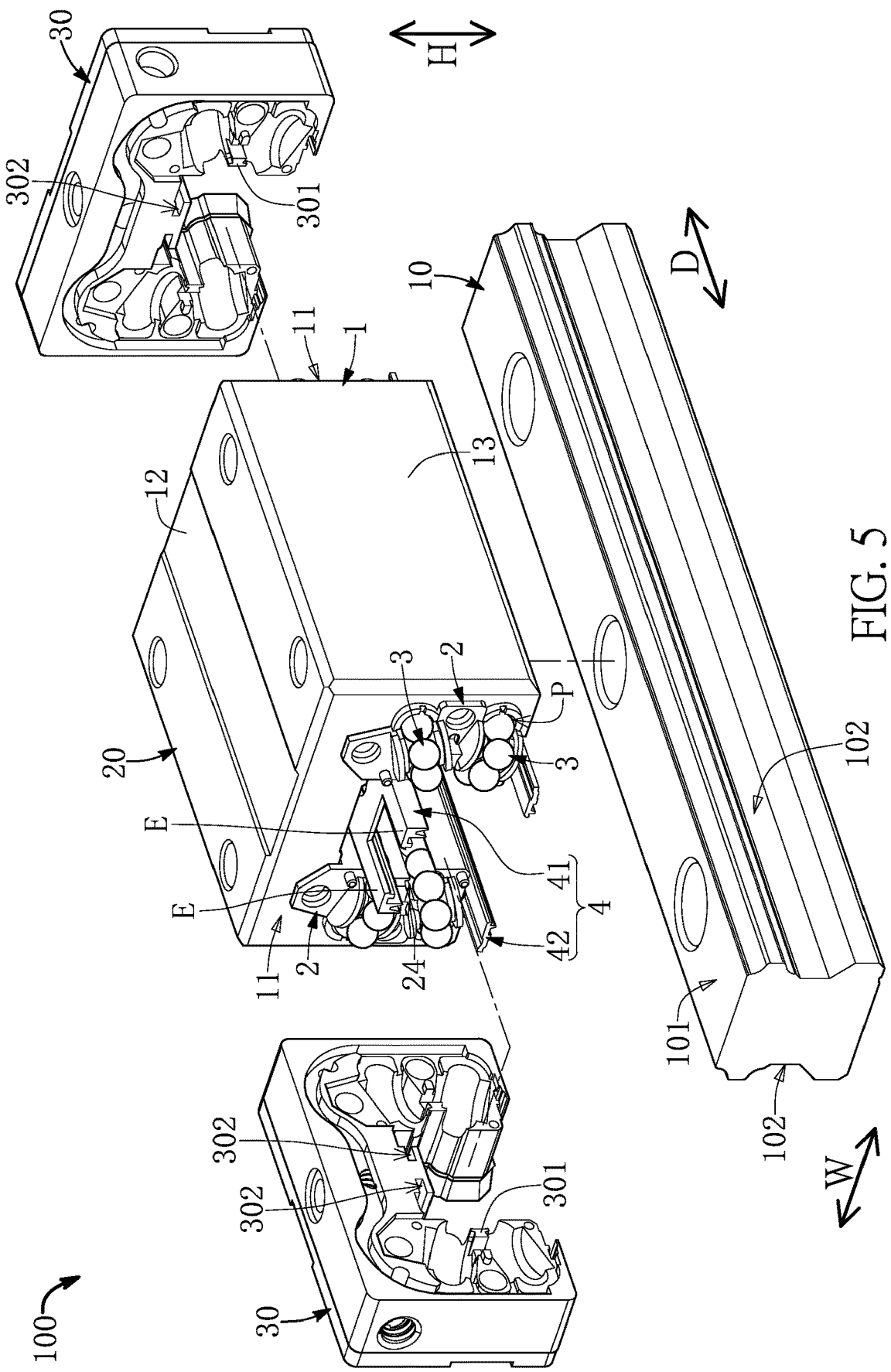
FIG. 5 is a schematic exploded view of FIG. 1.

As shown in FIG. 2, FIG. 4, and FIG. 5, a longitudinal direction of the track 10 defines the sliding direction D, and the track 10 has an upper surface 101 and two lateral surfaces 102 that are arranged on two opposite sides thereof. In the present embodiment, the track 10 has a straight shape, and the upper surface 101 and the two lateral surfaces 102 are parallel to the sliding direction D, but the present disclosure is not limited thereto. For example, in other embodiments of the present disclosure not shown in the drawings, the track 10 can be curved.

Figure 6:
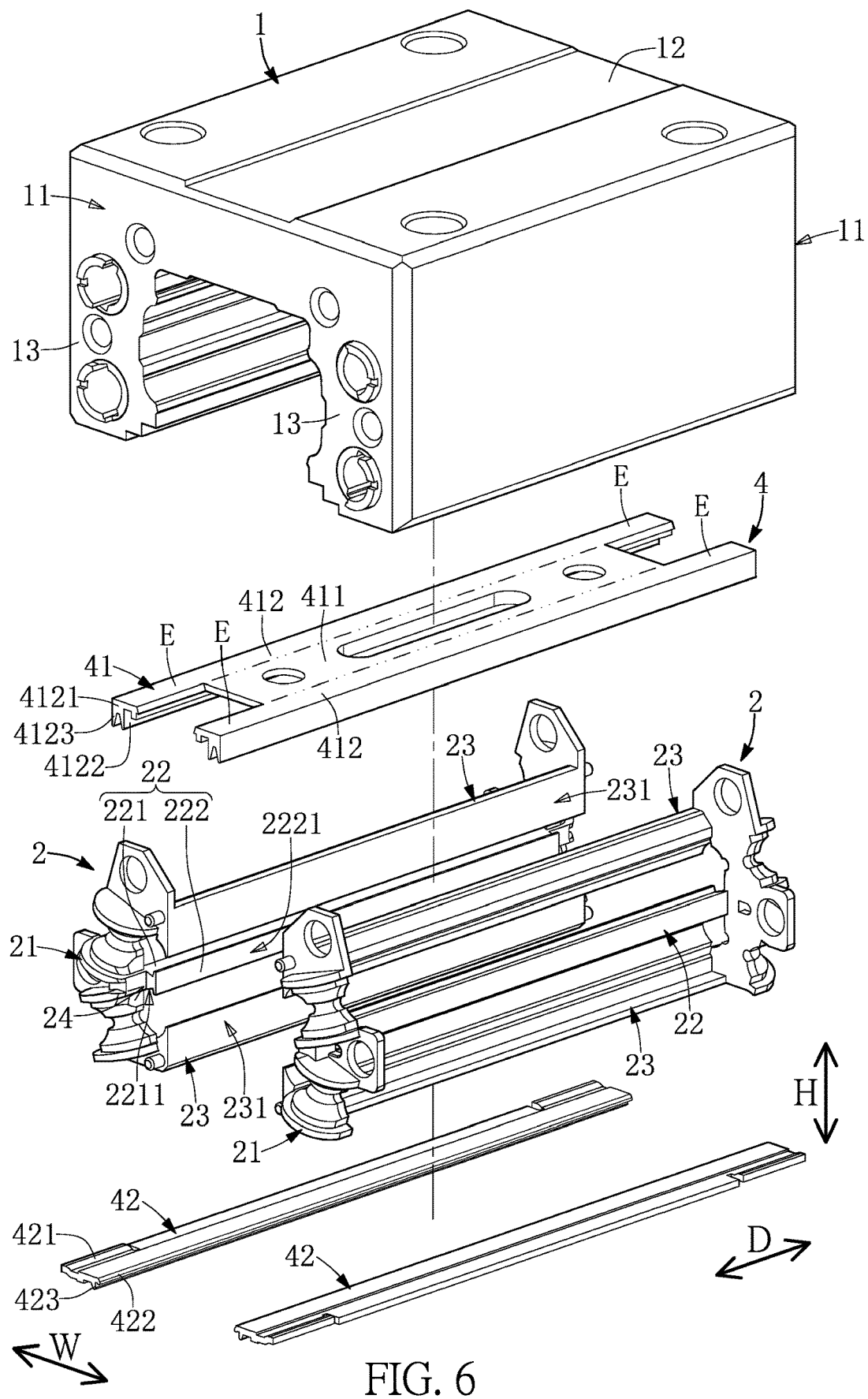
FIG. 6 is a schematic exploded view showing a sliding module of FIG. 5.

As shown in FIG. 4 to FIG. 6, the sliding module 20 in the present embodiment includes a slider 1, two circulation seats 2 assembled to the slider 1, a plurality of rollers 3 (e.g., rolling balls), and a plurality of dustproof members 4 that are assembled to the slider 1 and that abut against the track 10. Moreover, the two end caps 30 are respectively assembled to two end surfaces 11 of the slider 1, so that the sliding module 20 and the two end caps 30 can jointly define a plurality of rolling paths P, and the rollers 3 are respectively movable along the rolling paths P. Each of the rolling paths P is a closed loop, and the rolling paths P respectively correspond in position to the two lateral surfaces 102 of the track 10. Furthermore, two ends of each of the dustproof members 4 are respectively fixed to the two end caps 30, and the dustproof members 4 respectively abut against the upper surface 101 and the two lateral surfaces 102 of the track 10, thereby isolating the rolling paths P from an external environment so as to achieve a dustproof effect.

The slider 1 in the present embodiment has an elongated shape, and the sliding direction D can be defined by a longitudinal direction of the slider 1. The slider 1 includes a base portion 12 and two lateral wing portions 13 that respectively extend from the base portion 12, and the two end surfaces 11 of the slider 1 are perpendicular to the sliding direction D. Moreover, an inner side of the base portion 12 faces toward the upper surface 101 of the track 10, and inner sides of the two lateral wing portions 13 respectively face toward the two lateral surfaces 102 of the track 10.

Each of the two circulation seats 2 is limited to having an inherently one-piece structure, so that any circulation seat formed by assembling more than one component is different from the circulation seat 2 described in the present embodiment. The two circulation seats 2 are respectively assembled to the two lateral wing portions 13 of the slider 1 and respectively correspond in position to the two lateral surfaces 102.

As the two circulation seats 2 in the present embodiment are of the substantially same structure or are in a mirror-symmetrical arrangement, the following description discloses the structure of just one of the two circulation seats 2 for the sake of brevity, but the present disclosure is not limited thereto. For example, in other embodiments of the present disclosure not shown in the drawings, the two circulation seats 2 can be of different structures.

Figure 7:
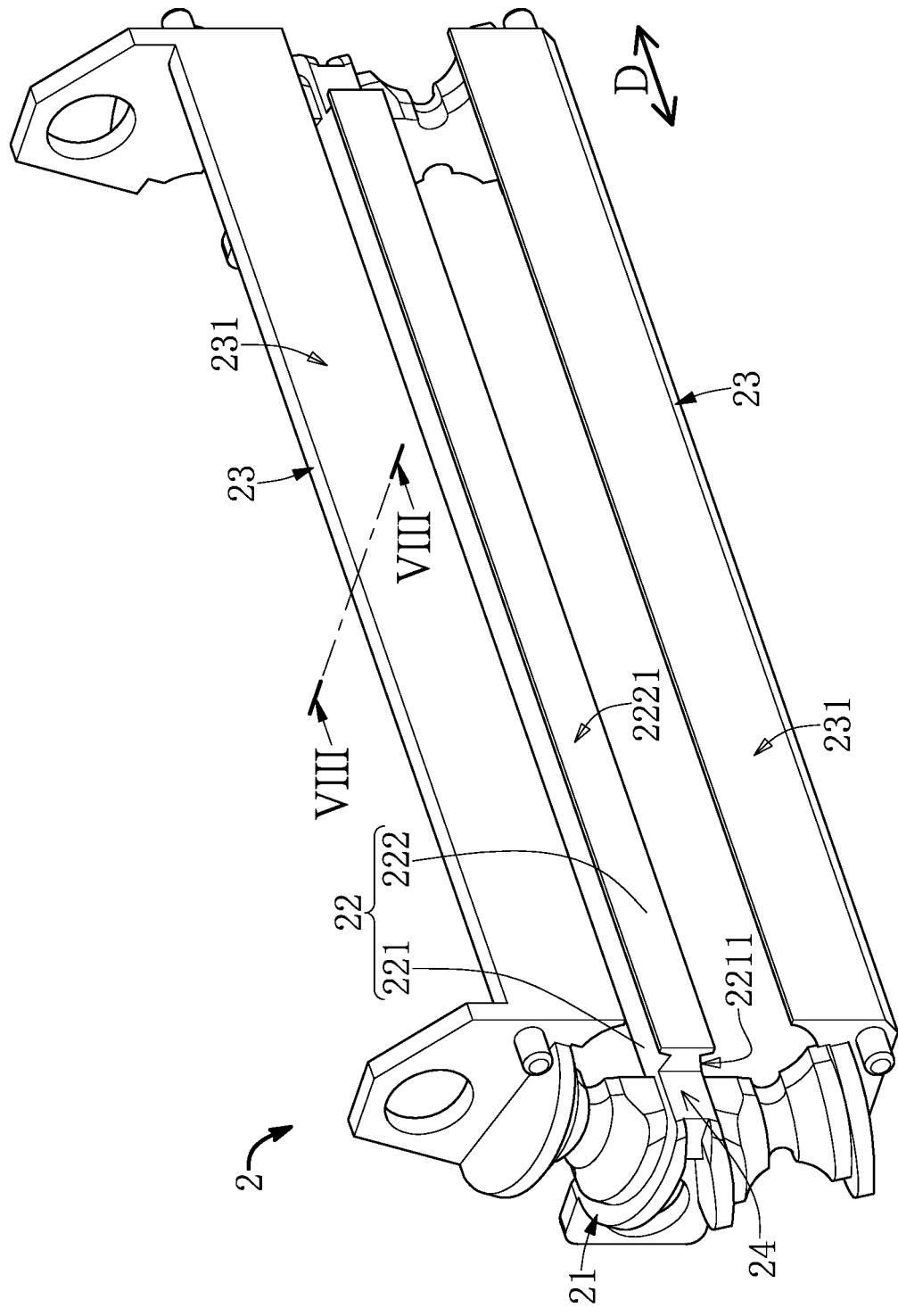
FIG. 7 is a schematic perspective view showing a circulation seat of FIG. 6.
Figure 8:
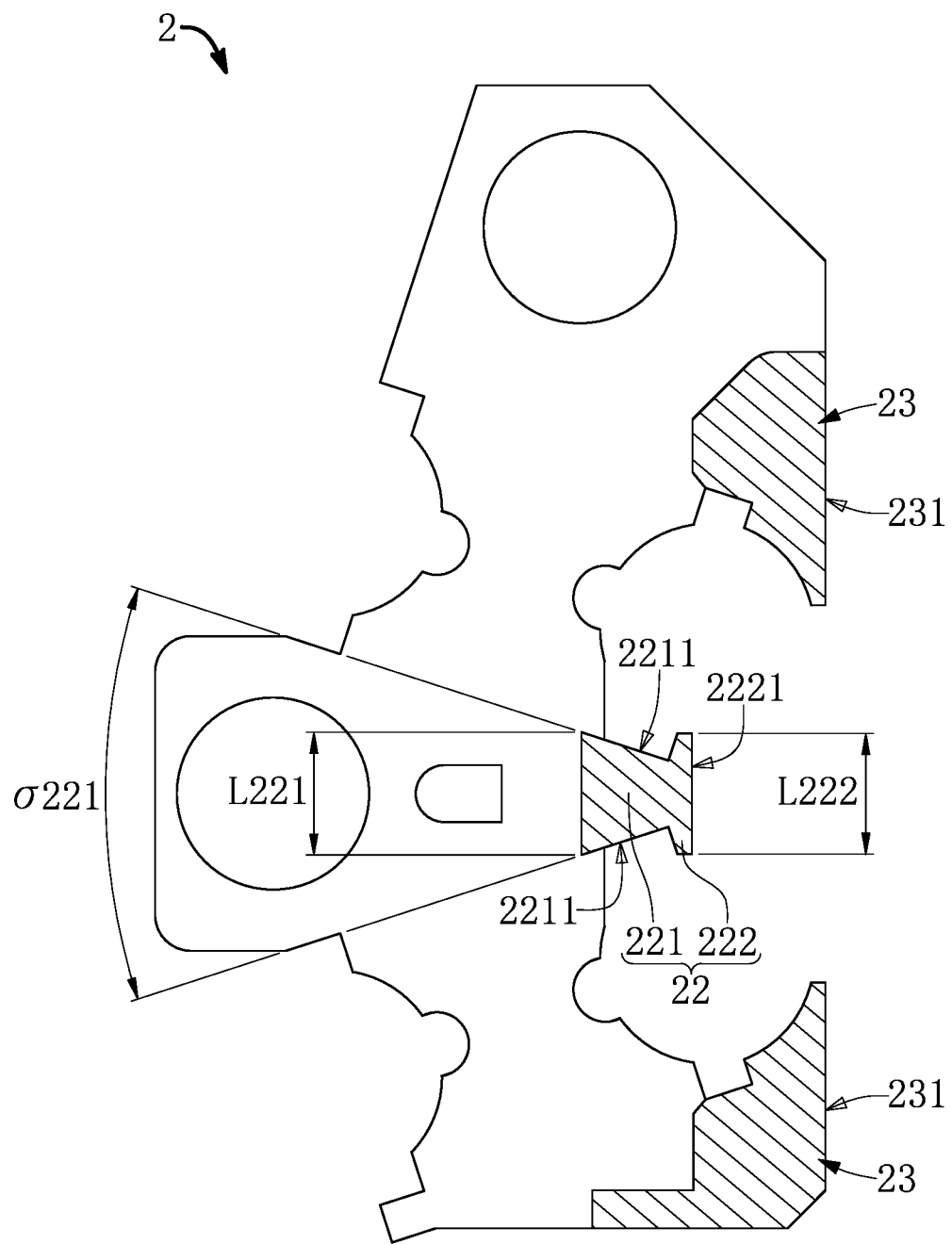
FIG. 8 is a schematic planar view of FIG. 7.

As shown in FIG. 6 to FIG. 8, the circulation seat 2 in the present embodiment includes two turning portions 21, a middle retaining portion 22, and two lateral retaining portions 23. Each of the middle retaining portion 22 and the two lateral retaining portions 23 is connected to and arranged between the two turning portions 21, and the two lateral retaining portions 23 are respectively arranged at two opposite sides of the middle retaining portion 22. Each of the middle retaining portion 22 and the two lateral retaining portions 23 is parallel to the sliding direction D, but the present disclosure is not limited thereto.

Specifically, the two turning portions 21 are respectively disposed on the two end surfaces 11 of the slider 1. In other words, each of the two end surfaces 11 of the slider 1 is provided with one of the two turning portions 21 of each of the two circulation seats 2 to be disposed thereon, so that each of the two end caps 30 covers one of the two turning portions 21 of each of the two circulation seats 2 (i.e., each of the two end caps 30 covers two of the turning portions 21 that are adjacent to each other and that respectively belong to the two circulation seats 2).

The middle retaining portion 22 is limited to having a two-stepped structure parallel to the sliding direction D. In other words, a structure of the middle retaining portion 22 in the present embodiment excludes a structure that is different from the two-stepped structure (e.g., a three-stepped structure), thereby facilitating two ends of the middle retaining portion 22 to be integrally connected to the two turning portions 21, respectively. Accordingly, the circulation seat 2 integrally formed as the single one-piece structure can be implemented.

The middle retaining portion 22 (or the two-stepped structure) in the present embodiment includes a connection bar 221 and a limiting bar 222 that is connected to the connection bar 221. The limiting bar 222 of the middle retaining portion 22 and any one of the two lateral retaining portions 23 respectively define two opposite sides of one of the rolling paths P, and can be further cooperated with the two turning portions 21 so as to enable the one of the rolling paths P to form the closed loop.

Moreover, each of the limiting bar 222 of the middle retaining portion 22 and the two lateral retaining portions 23 has a boundary surface 2221, 231 adjacent to the track 10. The boundary surfaces 2221, 231 are parallel to each other, and the boundary surfaces 231 of the two lateral retaining portions 23 are coplanar with each other.

Specifically, the connection bar 221 is connected to and arranged between the two turning portions 21, and a distance between two long lateral surfaces 2211 of the connection bar 221 gradually increases along a direction away from the limiting bar 222. The two long lateral surfaces 2211 of the connection bar 221 in the present embodiment have an arrangement angle σ221 therebetween that is within a range from 20 degrees to 45 degrees, thereby facilitating connection of two ends of the connection bar 221 to the two turning portions 21, respectively.

Moreover, in a cross section of the circulation seat 2 perpendicular to the sliding direction D (as shown in FIG. 8), the connection bar 221 has a trapezoidal cross section, and a bottom edge of the trapezoidal cross section has a length L221 that is within a range from 60% to 80% of a length L222 of the boundary surface 2221 of the limiting bar 222, but the present disclosure is not limited thereto.

Figure 3:
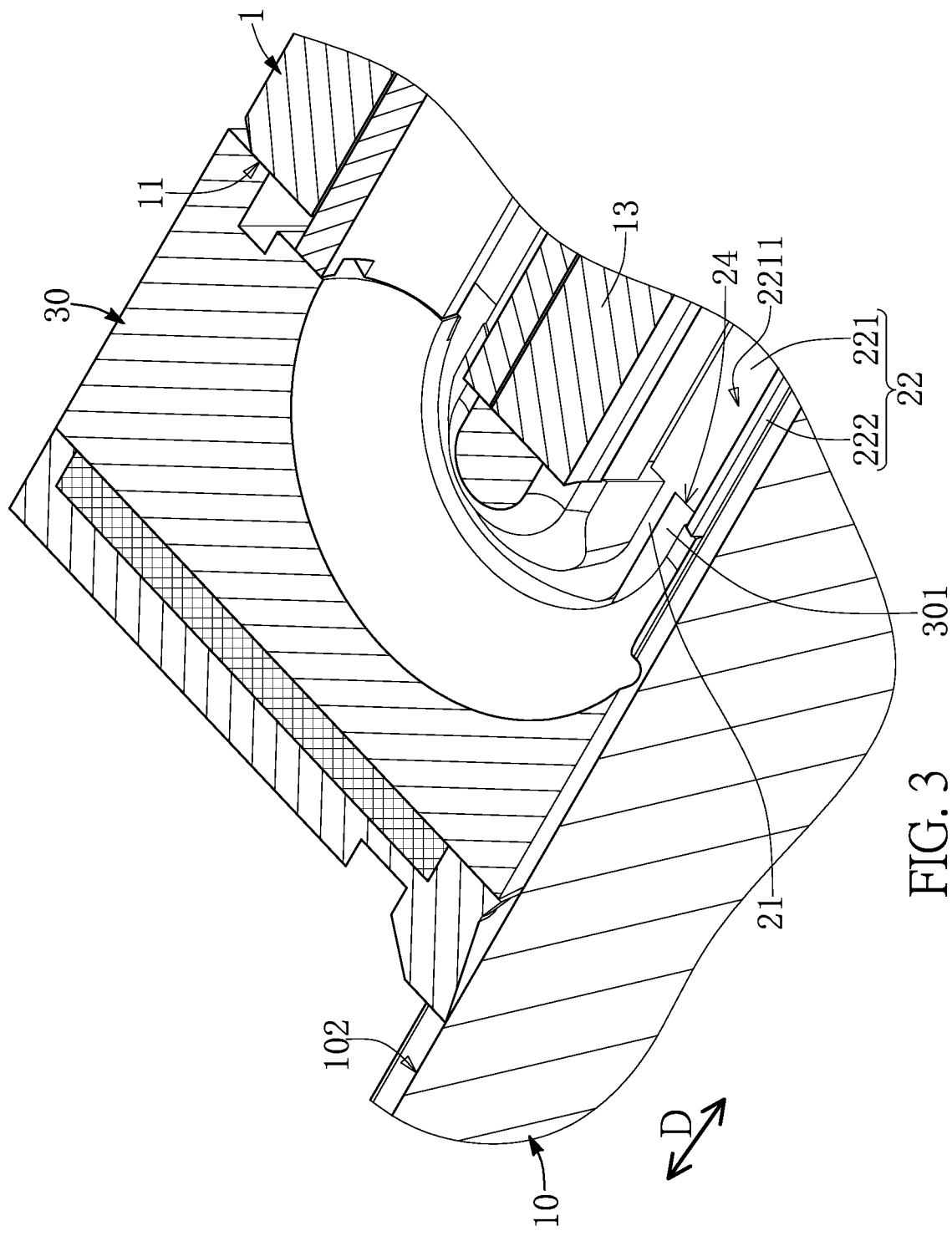
FIG. 3 is a schematic partial enlarged view of FIG. 2 with rollers being omitted.

The above description describes the structure of the circulation seat 2, and the following description describes the connection relationship of the components of the sliding module 20, but the present disclosure is not limited thereto. As shown in FIG. 3 and FIG. 5, in each of the two circulation seats 2, the connection bar 221 and any one of the two turning portions 21 can jointly define a notch 24. Each of the two end caps 30 includes two mating blocks 301 each corresponding in shape to any one of the notches 24, and the mating blocks 301 of the two end caps 30 are respectively inserted into the notches 24 of the two circulation seats 2. Furthermore, ends of the two long lateral surfaces 2211 of the connection bar 221 can be coplanar with surfaces of the two turning portions 21 adjacent thereto and surfaces of the two mating blocks 301 adjacent thereto.

In summary, the circulation seat 2 provided by the present embodiment is integrally formed as the single one-piece structure, so that the notches 24 can be precisely manufactured for facilitating precise structural cooperation between each of the notches 24 and the corresponding mating block 301. Accordingly, issues related to assembling tolerances of the conventional middle retainer can be effectively avoided in the circulation seat 2 of the present embodiment.

Figure 9:
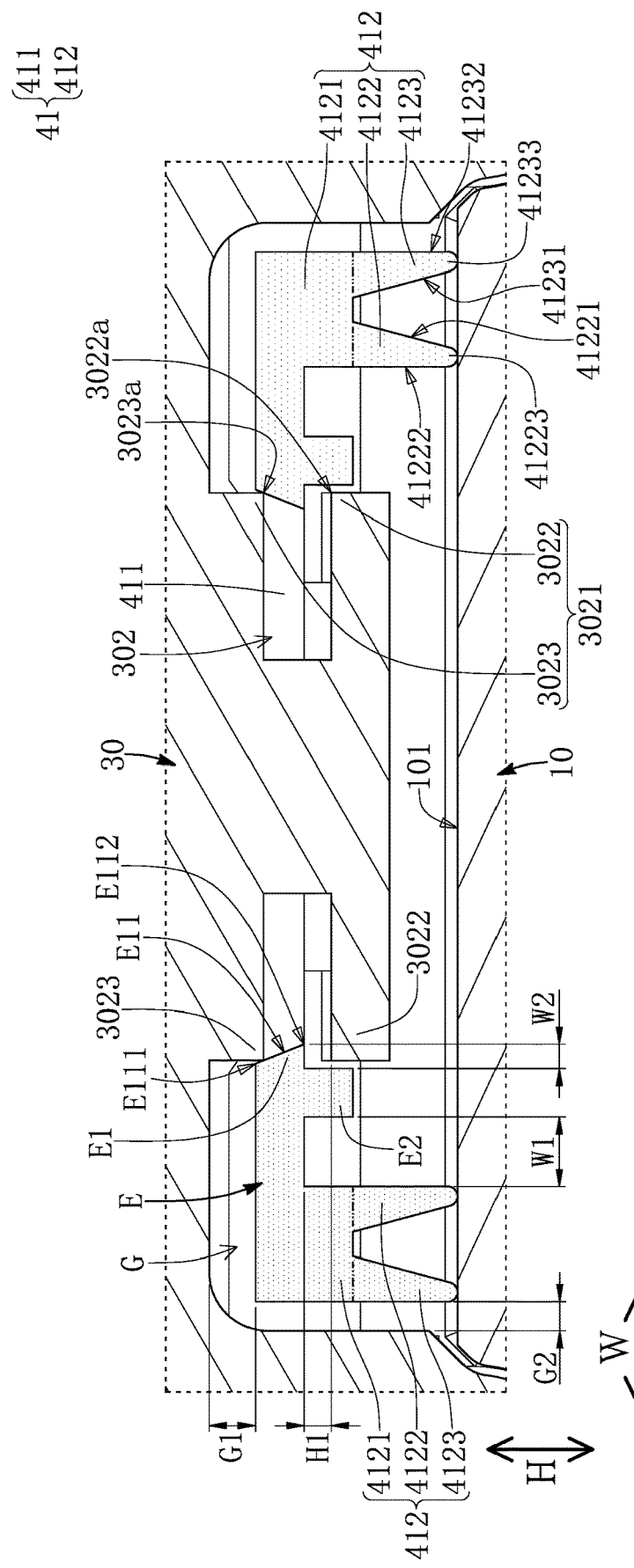
FIG. 9 is a schematic enlarged view of part IX of FIG. 4.

As shown in FIG. 5 and FIG. 9, each of the dustproof members 4 in the present embodiment has an inherently one-piece structure (e.g., a rubber member), and two ends of each of the dustproof members 4 are detachably engaged with the two end caps 30, respectively, so that each of the dustproof members 4 can be assembled to the two end caps 30 without using any fixing component (e.g., a screw) for achieving rapid assembly. In addition, the cooperation structures of each of the dustproof members 4 and the two end caps 30 can be adjusted or changed according to design requirements, and are not limited by the drawings of the present embodiment.

Specifically, the dustproof members 4 include an upper dustproof member 41 and two lower dustproof members 42. The upper dustproof member 41 has a connection segment 411 and two floating dustproof segments 412 that are respectively connected to two opposite sides of the connection segment 411. Each of the connection segment 411 and the two floating dustproof segments 412 is elongated and is parallel to the sliding direction D. The two floating dustproof segments 412 are respectively located at two opposite sides of the connection segment 411 along a width direction W perpendicular to the sliding direction D.

Each of the two floating dustproof segments 412 includes a carrying bar 4121, an inner rib 4122, and an outer rib 4123, the latter two of which are connected to the carrying bar 4121. Moreover, the carrying bar 4121, the inner rib 4122, and the outer rib 4123 of each of the two floating dustproof segments 412 are elongated and are parallel to the sliding direction D, and the outer ribs 4123 of the two floating dustproof segments 412 are respectively located at two opposite sides of the inner ribs 4122 of the two floating dustproof segments 412, but the present disclosure is not limited thereto. For example, in other embodiments of the present disclosure not shown in the drawings, each of the two floating dustproof segments 412 can be provided with one of the inner rib 4122 and the outer rib 4123. In other words, each of the two floating dustproof segments 412 can include at least one rib 4122, 4123 according to design requirements.

It should be noted that as the two floating dustproof segments 412 in the present embodiment are mirror-symmetrical with respect to the connection segment 411, the following description discloses the structure of just one of the two floating dustproof segments 412 for the sake of brevity, but the present disclosure is not limited thereto. For example, in other embodiments of the present disclosure not shown in the drawings, the two floating dustproof segments 412 can be of different structures.

In the present embodiment, inner side surfaces 41221, 41231 of the inner rib 4122 and the outer rib 4123 are arranged adjacent to each other and are parallel to the sliding direction D, and outer side surfaces 41222, 41232 of the inner rib 4122 and the outer rib 4123 are arranged away from each other and are parallel to the sliding direction D. Moreover, cross sections of the inner rib 4122 and the outer rib 4123 perpendicular to the sliding direction D are substantially the same, but the present disclosure is not limited thereto. For example, in other embodiments of the present disclosure not shown in the drawings, the cross sections of the inner rib 4122 and the outer rib 4123 perpendicular to the sliding direction D can be different from each other.

As shown in FIG. 4 and FIG. 9, a free end edge 41223 of the inner rib 4122 (e.g., a junction of the inner side surface 41221 and the outer side surface 41222) abuts against the upper surface 101 of the track 10 so as to form an inner interference distance within a range from 0 mm to 0.05 mm. Moreover, a free end edge 41233 of the outer rib 4123 (e.g., a junction of the inner side surface 41231 and the outer side surface 41232) abuts against the upper surface 101 of the track 10 so as to form an outer interference distance that is greater than the inner interference distance. Each of the free end edge 41223 of the inner rib 4122 and the free end edge 41233 of the outer rib 4123 has an arched shape having a radius of curvature within a range from 0.05 mm to 0.5 mm. The outer interference distance is preferably within a range from 0.05 mm to 0.1 mm, but the present disclosure is not limited thereto.

In the floating dustproof segment 412 of the present embodiment, a deformation of the inner rib 4122 with respect to the track 10 can be reduced to approach zero through the above structural design of the inner rib 4122 and the outer rib 4123, thereby preventing dust or particles from slipping into an interface between the inner rib 4122 and the upper surface 101 of the track 10. Accordingly, the inner rib 4122 can be maintained to gaplessly abut against the upper surface 101 of the track 10 for increasing the dustproof effect.

In each of the two floating dustproofing segments 412, the carrying bar 4121 has two end portions E respectively protruding beyond the two end surfaces 11 of the slider 1 along the sliding direction D, and each of the two end portions E has a bevel E1 that is arranged away from the inner rib 4122 and the outer rib 4123 and that has a slanting surface E11. An angle σ1 between the slanting surface E11 of each of the end portions E and the width direction W is within a range from 40 degrees to 60 degrees.

Moreover, each of the end portions E has a limiting block E2 arranged adjacent to the bevel E1. In other words, in each of the end portions E, the limiting block E2 is located between the bevel E1 and the inner rib 4122, and the limiting block E2 is spaced apart from the inner rib 4122 along the width direction W by a distance W1 that is within a range from 0.7 mm to 1.0 mm.

In addition, each of the two end caps 30 has two tolerance slots 302 recessed in a surface thereof arranged adjacent to the corresponding end surface 11. In each of the two end caps 30, slot openings 3021 of the two tolerance slots 302 are arranged away from each other along the width direction W, and each of the slot openings 3021 has a stopping corner 3022 and a matching corner 3023 that faces toward the stopping corner 3021 along a thickness direction H perpendicular to the sliding direction D and the width direction W.

Specifically, the bevels E1 of the end portions E of the upper dustproof member 41 are respectively inserted into the tolerance slots 302 of the two end caps 30, and each of the end portions E and the corresponding end cap 30 have a tolerance gap G therebetween, so that when the inner rib 4122 and the outer rib 4123 of each of the two floating dustproof segments 412 abuts against the upper surface 101 of the track 10, the slanting surface E11 of each of the bevels E1 abut against the matching corner 3023 of the corresponding tolerance slot 302, and each of the end portions E is deformable toward the corresponding tolerance gap G, thereby absorbing/accommodating/compensating for an assembling tolerance of components in the linear guideway 100 and maintaining a contact force between the upper dustproof member 41 and the track 10.

Moreover, in order to enable the cooperation between the upper dustproof member 41 and the two end caps 30 to effectively absorb the assembling tolerance and to maintain the contact force, each of the end portions E and the corresponding tolerance slot 302 in the present embodiment preferably have at least part of the following features, but the present disclosure is not limited thereto.

Specifically, each of the stopping corner 3022 and the matching corner 3023 is right-angled, an edge 3022a of the stopping corner 3022 and an edge 3023a of the matching corner 3023 are flush with each other along the thickness direction H, the bevel E1 is not in contact with the stopping corner 3022 (e.g., the bevel E1 being spaced apart from the stopping corner 3022 along the thickness direction H by a gap H1 that is within a range from 0.05 mm to 0.5 mm), and the slanting surface E11 abuts against the edge 3023a of the matching corner 3023.

Moreover, along the thickness direction H, the tolerance gap G between each of the end portions E and the corresponding end cap 30 has a distance G1 that is within a range from 0.05 mm to 0.5 mm. Furthermore, along the width direction W, the tolerance gap G between each of the end portions E and the corresponding end cap 30 has a distance G2 that is within a range from 0.05 mm to 0.5 mm. Along the width direction W, the limiting block E2 is spaced apart from a lower edge E112 of the slanting surface E11 adjacent to the stopping corner 3022 by a distance W2 that is within a range from 0.2 mm to 0.5 mm.

It should be noted that the upper dustproof member 41 in the present embodiment is described in cooperation with the above components, but the present disclosure is not limited thereto. For example, in other embodiments of the present disclosure not shown in the drawings, the upper dustproof member 41 can be independently used (e.g., sold) or can be used in cooperation with other components.

The above description describes the upper dustproof member 41 and the two end caps 30, and the following description describes the two lower dustproof members 42. As shown in FIG. 4 and FIG. 6, the two lower dustproof members 42 respectively abut against the two lateral surfaces 102 of the track 10.

It should be noted that as the two lower dustproof members 42 in the present embodiment are in a mirror-symmetrical arrangement, the following description discloses the structure of just one of the two lower dustproof members 42 for the sake of brevity, but the present disclosure is not limited thereto. For example, in other embodiments of the present disclosure not shown in the drawings, the two lower dustproof members 42 can be of different structures.

Specifically, the lower dustproof member 42 includes an assembling segment 421, an upper rib 422 connected to the assembling segment 421, and a lower rib 423 that is connected to the assembling segment 421. Each of the assembling segment 421, the upper rib 422, and the lower rib 423 is elongated and is parallel to the sliding direction D. In other words, the assembling segment 421, the upper rib 422, and the lower rib 423 are parallel to each other.

In the present embodiment, cross sections of the upper rib 422 and the lower rib 423 perpendicular to the sliding direction D are substantially the same, but the present disclosure is not limited thereto. For example, in other embodiments of the present disclosure not shown in the drawings, the cross sections of the upper rib 422 and the lower rib 423 perpendicular to the sliding direction D can be different from each other.

Specifically, in each of the two lower dustproof members 42, a free end edge of the upper rib 422 abuts against the corresponding lateral surface 102 of the track 10 so as to form an upper interference distance within a range from 0 mm to 0.05 mm. Moreover, a free end edge of the lower rib 423 abuts against the corresponding lateral surface 102 of the track 10 so as to form a lower interference distance within a range from 0 mm to 0.05 mm.

In the lower dustproof member 42 of the present embodiment, a deformation of any one of the upper rib 422 and the lower rib 423 with respect to the track 10 can be reduced to approach zero through the above structural design of the upper rib 422 and the lower rib 423, thereby preventing dust or particles from slipping into an interface between the upper rib 422 (or the lower rib 423) and the corresponding lateral surface 102 of the track 10. Accordingly, the upper rib 422 (or the lower rib 423) can be maintained to gaplessly abut against the corresponding lateral surface 102 of the track 10 for increasing the dustproof effect.

Second Embodiment

Figure 10:
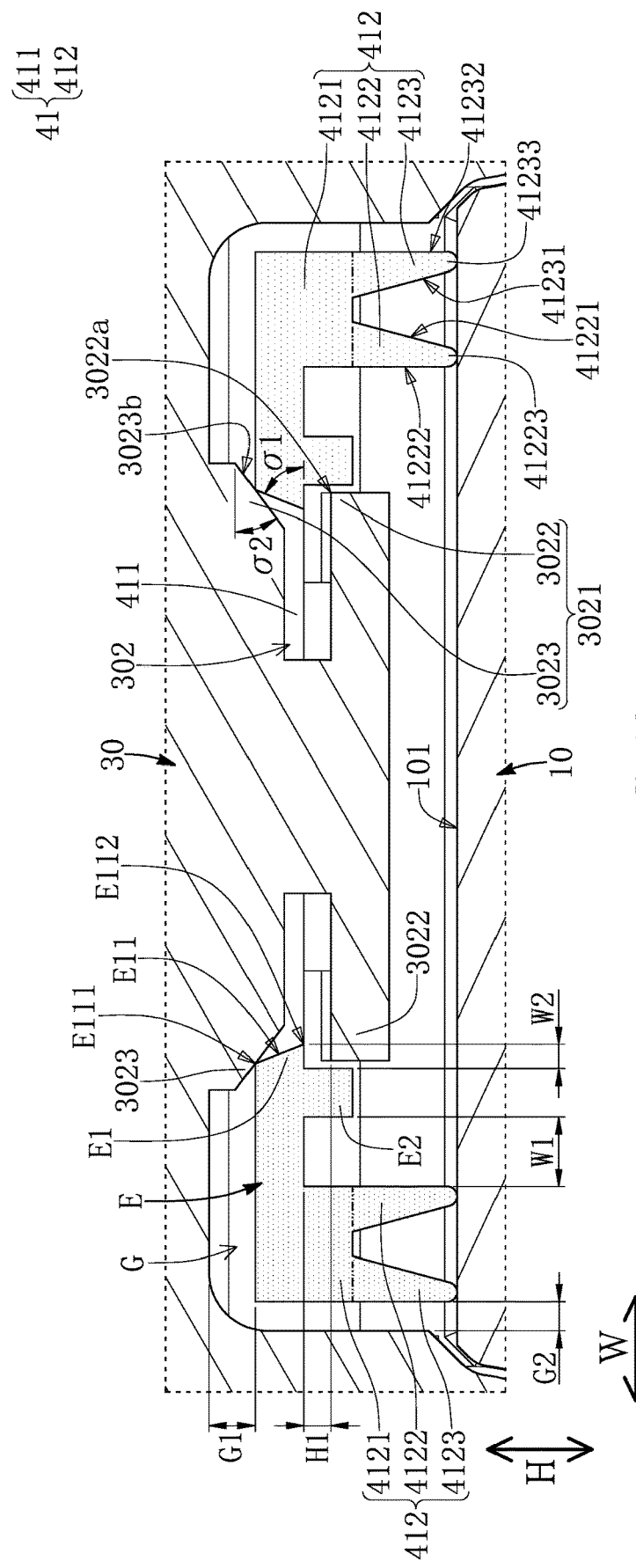
FIG. 10 is a schematic cross-sectional view showing a part of the linear guideway according to a second embodiment of the present disclosure.

Referring to FIG. 10, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, in each of the end portions E and the corresponding tolerance slot 302, the stopping corner 3022 is right-angled, the matching corner 3023 is beveled and has a guiding (and slanting) surface 3023b, and the edge 3022a of the stopping corner 3022 is aligned with the guiding surface 3023b along the thickness direction H. In other words, any slanting surface that is not aligned with the stopping corner 3022 along the thickness direction H is different from the guiding surface 3023b disclosed in the present embodiment.

Moreover, in each of the end portions E and the corresponding tolerance slot 302, the angle σ1 between the slanting surface E11 and the width direction W is preferably greater than an angle σ2 between the guiding surface 3023b and the width direction W, and an upper edge E111 of the slanting surface E11 arranged away from the stopping corner 3022 abuts against the guiding surface 3023b.

Accordingly, the upper dustproof member 41 and the two end caps 30 can be provided for meeting different requirements through a structural adjustment of the matching corner 3023 of the tolerance slot 302 (e.g., the matching corner 3023 being adjusted to be right-angled or beveled).

Beneficial Effects of the Embodiments

In conclusion, the linear guideway provided by the present disclosure can allow each of the end portions to be deformable toward the corresponding tolerance gap through the structural cooperation between each of the end portions and the corresponding tolerance slot, thereby absorbing an assembling tolerance of components in the linear guideway and maintaining a contact force between the upper dustproof member and the track.

Moreover, in the linear guideway provided by the present disclosure, the circulation seat can be integrally formed as a single one-piece structure through the structural design of the middle retaining portion (e.g., the middle retaining portion being the two-stepped structure, and a distance between two long lateral surfaces of the connection bar gradually increasing along a direction away from the limiting bar), thereby effectively avoiding problems associated with the middle retainer of the conventional linear guideway (e.g., the problems relating to alignment accuracy requirements, assembling tolerances, and stress concentration due to rotation).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A linear guideway, comprising:
   a track having two lateral surfaces respectively arranged on two opposite sides thereof and an upper surface that is connected to the two lateral surfaces;
   a sliding module slidably disposed on the track along a sliding direction, wherein the sliding module includes:
      a slider having a base portion and two lateral wing portions that respectively extend from the base portion, wherein inner sides of the two lateral wing portions respectively face toward the two lateral surfaces;
      two circulation seats respectively assembled to the two lateral wing portions and respectively corresponding in position to the two lateral surfaces; and
      an upper dustproof member including:
         a connection segment corresponding in position to the base portion of the slider; and
         two floating dustproof segments respectively connected to two opposite sides of the connection segment, wherein each of the two floating dustproofing segments has a carrying bar and at least one rib that is connected to the carrying bar, and wherein, in each of the two floating dustproofing segments, the carrying bar has two end portions respectively protruding beyond two end surfaces of the slider, and each of the two end portions has a bevel arranged away from the at least one rib; and
      two end caps respectively assembled to the two end surfaces of the slider and slidably disposed on the track, wherein each of the two end caps has two tolerance slots recessed in a surface thereof arranged adjacent to the corresponding end surface, and wherein, in each of the two end caps, slot openings of the two tolerance slots are arranged away from each other along a width direction perpendicular to the sliding direction, and each of the slot openings has a stopping corner and a matching corner that faces toward the stopping corner along a thickness direction perpendicular to the sliding direction and the width direction;
   wherein the bevels of the end portions of the upper dustproof member are respectively inserted into the tolerance slots of the two end caps, and each of the end portions and the corresponding end cap have a tolerance gap therebetween, so that when the at least one rib of each of the two floating dustproof segments abuts against the upper surface of the track, a slanting surface of each of the bevels abuts against the matching corner of the corresponding tolerance slot, and each of the end portions is deformable toward the corresponding tolerance gap.

2. The linear guideway according to claim 1, wherein, in each of the end portions and the corresponding tolerance slot, an angle between the slanting surface and the width direction is within a range from 40 degrees to 60 degrees, and the bevel is not in contact with the stopping corner.

3. The linear guideway according to claim 2, wherein, in each of the end portions and the corresponding tolerance slot, the bevel is spaced apart from the stopping corner along the thickness direction by a gap that is within a range from 0.05 mm to 0.5 mm.

4. The linear guideway according to claim 1, wherein, in each of the end portions and the corresponding tolerance slot, each of the stopping corner and the matching corner is right-angled, an edge of the stopping corner and an edge of the matching corner are flush with each other along the thickness direction, and the slanting surface abuts against the edge of the matching corner.

5. The linear guideway according to claim 1, wherein, in each of the end portions and the corresponding tolerance slot, the stopping corner is right-angled, the matching corner is beveled and has a guiding surface, an edge of the stopping corner is aligned with the guiding surface along the thickness direction, an angle between the slanting surface and the width direction is greater than an angle between the guiding surface and the width direction, and an upper edge of the slanting surface arranged away from the stopping corner abuts against the guiding surface.

6. The linear guideway according to claim 1, wherein, along the thickness direction, the tolerance gap between each of the end portions and the corresponding end cap has a distance that is within a range from 0.05 mm to 0.5 mm.

7. The linear guideway according to claim 1, wherein, along the width direction, the tolerance gap between each of the end portions and the corresponding end cap has a distance that is within a range from 0.05 mm to 0.5 mm.

8. The linear guideway according to claim 1, wherein each of the end portions has a limiting block arranged adjacent to the bevel, wherein, in each of the end portions and the corresponding tolerance slot, the limiting block is spaced apart from the at least one rib along the width direction by a distance that is within a range from 0.7 mm to 1.0 mm, and the limiting block is spaced apart from a lower edge of the slanting surface of the stopping corner along the width direction by a distance that is within a range from 0.2 mm to 0.5 mm.

9. The linear guideway according to claim 1, wherein the at least one rib of each of the two floating dustproofing segments has a free end edge that abuts against the upper surface of the track and that has an arched shape having a radius of curvature within a range from 0.05 mm to 0.5 mm.

10. An upper dustproof member of a linear guideway, comprising:
a connection segment; and
two floating dustproof segments respectively connected to two opposite sides of the connection segment, wherein each of the two floating dustproofing segments has a carrying bar and at least one rib that is connected to the carrying bar, and wherein, in each of the two floating dustproofing segments, the carrying bar has two end portions each having a bevel arranged away from the at least one rib;
wherein, when the bevels of the end portions of the upper dustproof member are respectively inserted into four tolerance slots of two end caps, each of the end portions and the corresponding end cap have a tolerance gap therebetween, so that a slanting surface of each of the bevels abuts against the corresponding tolerance slot, and each of the end portions is deformable toward the corresponding tolerance gap.

* * * * *